(12) United States Patent
Foukas et al.

(10) Patent No.: US 12,730,612 B2
(45) Date of Patent: Sep. 8, 2026

(54) GENERATION OF CODELETS FOR NETWORK FUNCTIONS BASED ON LARGE LANGUAGE MODEL

(71) Applicant: Microsoft Technology Licensing, LLC, Redmond, WA (US)

(72) Inventors: Xenofon Foukas, Cambridge (GB); Bozidar Radunovic, Cambridge (GB); Ganesh Ananthanarayanan, Redmond, WA (US); Matthew Balkwill, Trowbridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 18/673,004

(22) Filed: May 23, 2024

(65) Prior Publication Data

US 2025/0362887 A1 Nov. 27, 2025

(51) Int. Cl.

*G06F 8/30* (2018.01)
*G06F 8/41* (2018.01)
*G06F 40/20* (2020.01)

(52) U.S. Cl.

CPC ................ *G06F 8/31* (2013.01); *G06F 8/451* (2013.01); *G06F 40/20* (2020.01)

(58) Field of Classification Search

USPC ........................................................ 717/106
See application file for complete search history.

(56) References Cited

U.S. PATENT DOCUMENTS 11,968,088 B1 * 4/2024 Yan ..................... H04L 41/0823
2025/0148289 A1 * 5/2025 Mukherjee ............ G06F 16/248
2025/0231745 A1 * 7/2025 Moten ....................... G06F 8/35
2025/0272149 A1 * 8/2025 Eleti ....................... G06F 9/453
2025/0315223 A1 * 10/2025 Chlipala .................. G06F 8/34

OTHER PUBLICATIONS

Angert et al., "Spellburst: A Node-based Interface for Exploratory Creative Coding with Natural Language Prompts," ACM, 2023. (Year: 2023).*
Subramonyam et al., "Bridging the Gulf of Envisioning: Cognitive Challenges in Prompt Based Interactions with LLMs," ACM, 2024. (Year: 2024).*
Wang et al., "When Large Language Models Meet Optical Networks: Paving the Way for Automation," arXiv, 2024. (Year: 2024).*

* cited by examiner

*Primary Examiner* — Ryan D. Coyer
(74) *Attorney, Agent, or Firm* — ArentFox Schiff LLP

(57) ABSTRACT

Example implementations include a method, apparatus, and computer-readable medium configured for generating codelets. An interface between a user and a large language model receives a natural language intent for a codelet to be executed within a network function to output one or more requested pieces of information from the network function. A codelet generation application generates a prompt to the large language model to write a codelet in an imperative procedural language to output the one or more requested pieces of information, the prompt including a hook point of the network function and one or more data fields of the network function associated with the one or more requested pieces of information. The application receives, in response to the prompt, imperative procedural language code for the codelet. The application statically verifies whether the procedural language code for the codelet satisfies constraints for execution within the network function.

17 Claims, 6 Drawing Sheets

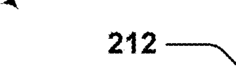

212

Generate a codelet that reports average number of packets scheduled by the cell every minute.

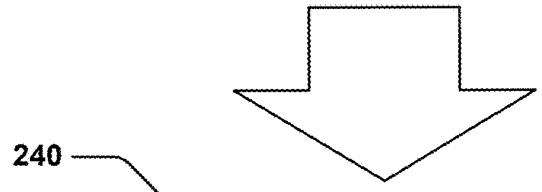

240

*Generate C code for a codelet for execution at hookpoint X1934 of vDU model Y9572 that calculates a mean value of nDCI field over a 1 minute interval. Use field names from <<Header>>, input from <<hookpoint>>, functions from <<whitelist>>, and output to <<structure>>.*

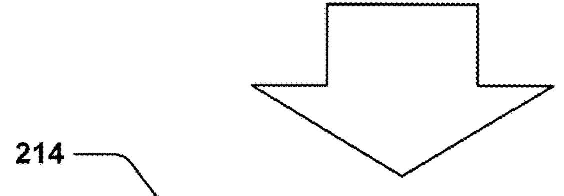

214

```
…
//timestamp and identifying information
Out->timestamp = janus_time_get_ns();
Out->cell_id = ctx->cell_id;
Out->frame = ctx->frame;
Out->slot = ctx_slot;
Out->n_pdu = dl_data->nPDU

// add and increase packet counter
Uint32_t cnt_ind = 0
Uint32_t *cnt = (uint32_t *)janus_map_lookup_elem(msg_cnt, &cnt_ind);
If (!cnt)
        return 0;
Out->janus_msg_id = *cnt;
(*cnt)++;
Out->n_dci = 0;
…
```

Figure 3

GENERATION OF CODELETS FOR NETWORK FUNCTIONS BASED ON LARGE LANGUAGE MODEL

TECHNICAL FIELD

The present disclosure relates to communications networks and, in particular, to generating codelets for network functions based on large language model.

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge data center with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various remote units (RU), which can provide at least PHY and/or MAC layers of a base station or other RAN node of the mobile network, can be deployed at edge servers. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the edge data center utilizes generic computing resources, a virtualized RAN may provide scalability and fault tolerance for base station processing. For example, the edge data center may assign a variable number of computing resources (e.g., servers) to perform PHY layer processing for the radio units associated with the edge data center based on a workload. Further, a virtualized RAN may implement multiple layers of RAN processing at a data center, enabling collection of multiple data feeds.

One technique for collection of data feeds is a codelet that executes within a network function. Such codelets can access low-level operational data of a network function. The execution of a codelet within a network function may be subject to verification of safety and timing requirements. Further, network functions in a virtualized network or open-RAN may be provided by various vendors. Accordingly, generating a custom codelet to collect information from a network function may be a difficult task for network operators.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus including: one or more memories storing computer executable instructions; and one or more processors coupled with the one or more memories and, individually or in combination, configured to: receive, at an interface between a user and a large language model, a natural language intent for a codelet to be executed within a network function to output one or more requested pieces of information from the network function; generate a prompt to the large language model to write a codelet in an imperative procedural language to output the one or more requested pieces of information, the request including a hook point of the network function and one or more data fields of the network function associated with the one or more requested pieces of information; receive, in response to the request, imperative procedural language code for the codelet; and statically verify whether the procedural language code for the codelet satisfies constraints for execution within the network function.

In some aspects, the techniques described herein relate to a method of generating codelets for execution within a network function of a 5G network, including: receiving, at an interface between a user and a large language model, a natural language intent for a codelet to be executed within a network function to output one or more requested pieces of information from the network function; generating a prompt to the large language model to write a codelet in an imperative procedural language to output the one or more requested pieces of information, the prompt including a hook point of the network function and one or more data fields of the network function associated with the one or more requested pieces of information; receiving, in response to the prompt, imperative procedural language code for the codelet; and statically verifying whether the procedural language code for the codelet satisfies constraints for execution within the network function.

In some aspects, the techniques described herein relate to a non-transitory computer-readable medium having computer-executable instructions stored thereon that when executed by a computer processor cause the computer processor to: receive, at an interface between a user and a large language model, a natural language intent for a codelet to be executed within a network function to output one or more requested pieces of information from the network function; generate a prompt to the large language model to write a codelet in an imperative procedural language to output the one or more requested pieces of information, the prompt including a hook point of the network function and one or more data fields of the network function associated with the one or more requested pieces of information; receive, in response to the prompt, imperative procedural language code for the codelet; and statically verify whether the procedural language code for the codelet satisfies constraints for execution within the network function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3 is a diagram of an example natural language intent, generated prompt, and resulting draft codelet.

DETAILED DESCRIPTION

Figure 1:
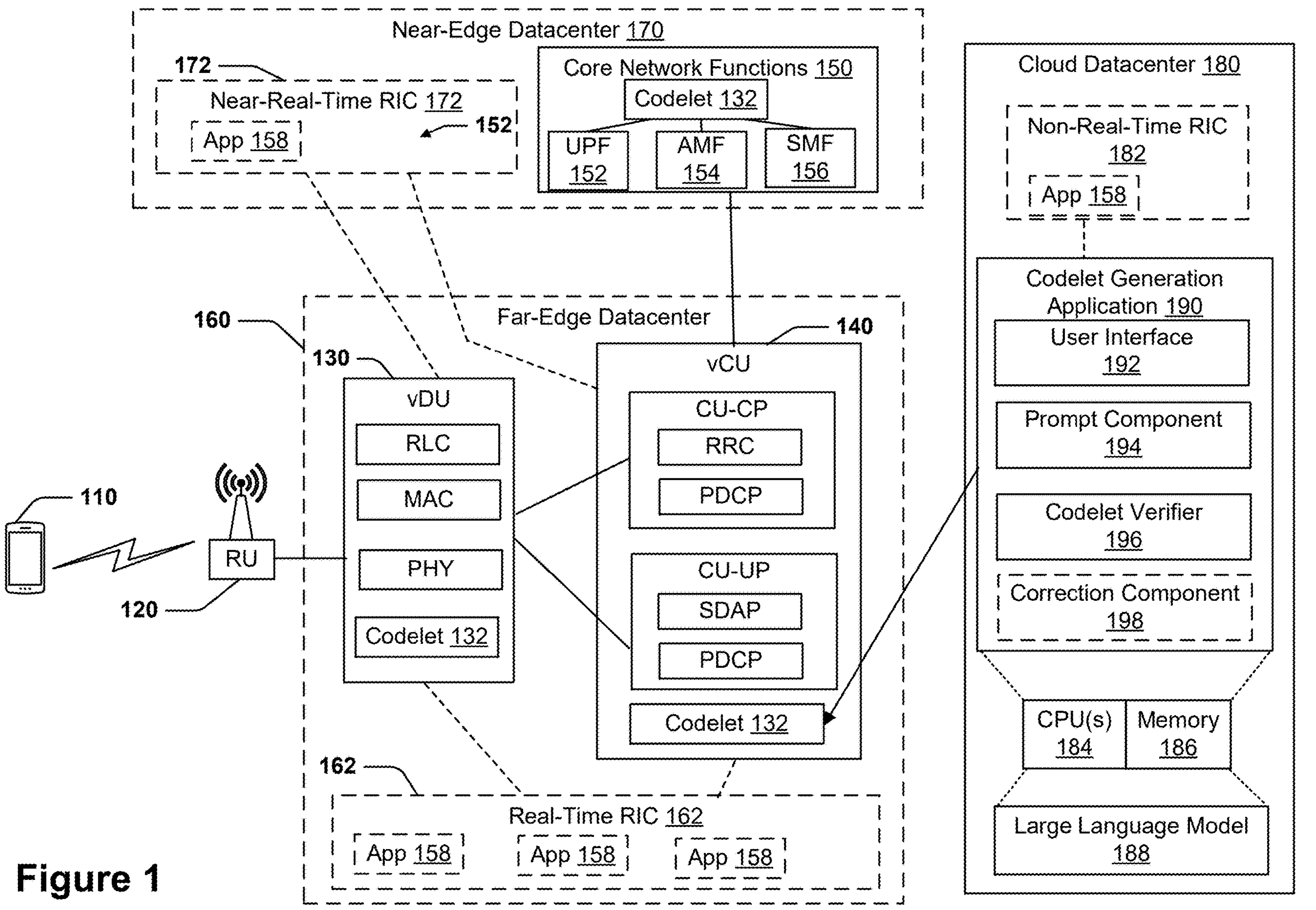
FIG. 1 is a diagram of an example virtualized radio access network (vRAN) that provides connectivity to a user equipment (UE).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Large Language Model (LLM) is a term that refers to artificial intelligence or machine-learning models that can generate natural language texts from large amounts of data. Large language models use deep neural networks, such as transformers, to learn from billions or trillions of words, and to produce texts on any topic or domain. Large language models can also perform various natural language tasks, such as classification, summarization, translation, generation, and dialogue.

This disclosure describes various examples related to generation of codelets for execution within network functions using a LLM. A codelet generation application acts as an interface between a user such as a network operator and the LLM. The user submits a natural language request for the codelet generation application to generate a codelet that outputs one or more requested pieces of information from the network function. The codelet generation application generates a prompt based on the natural language request that specifies the requirements of the codelet for a particular network function. For example, the prompt may include a hook point of the network function and one or more data fields of the network function. For instance, the codelet generation application may utilize a dynamic service model of the network function to identify a hook point and associated data fields that correspond to the requested pieces of information. The prompt generated by the codelet generation application can also specify the formal requirements of a codelet. The codelet generation application also includes a verifier for verifying that the codelet generated by the LLM satisfies the constraints for execution within the network function.

Implementations of the present disclosure may realize one or more of the following technical effects. The use of a LLM allows faster development of codelets. Further, because the codelet generation application receives a natural language request and performs the difficult technical aspects of generating the codelet, the required level of knowledge and skill for generating codelets can be lowered. Additionally, the use of the LLM for codelet generation may produce codelets in a uniform style that improves monitoring and maintenance. Moreover, the generation of codelets can improve the performance of a RAN by implementing analytics and optimizations based on the collected data.

Figure 4:
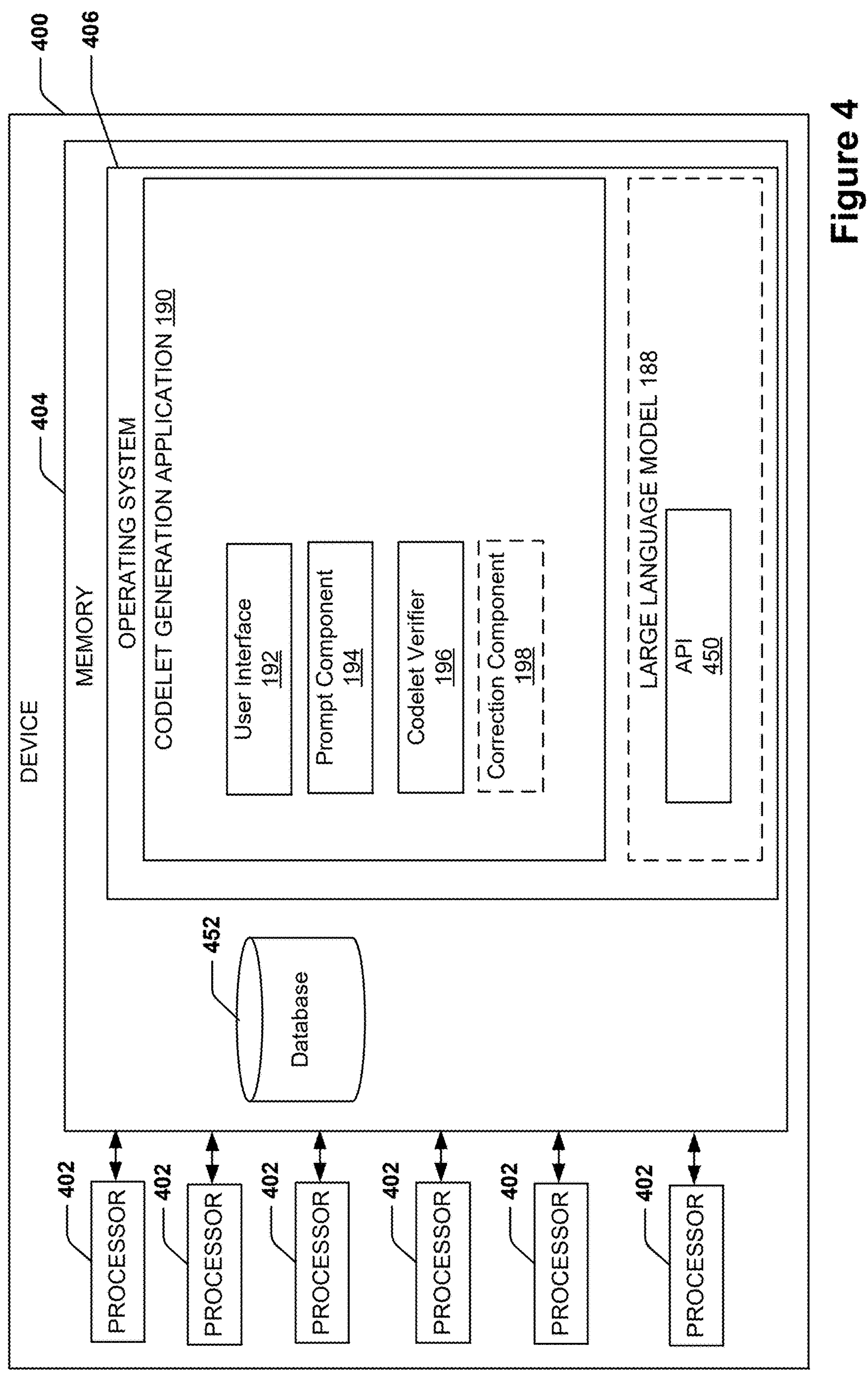
FIG. 4 is a schematic diagram of an example of an apparatus for generating codelets using a LLM.
Figure 5:
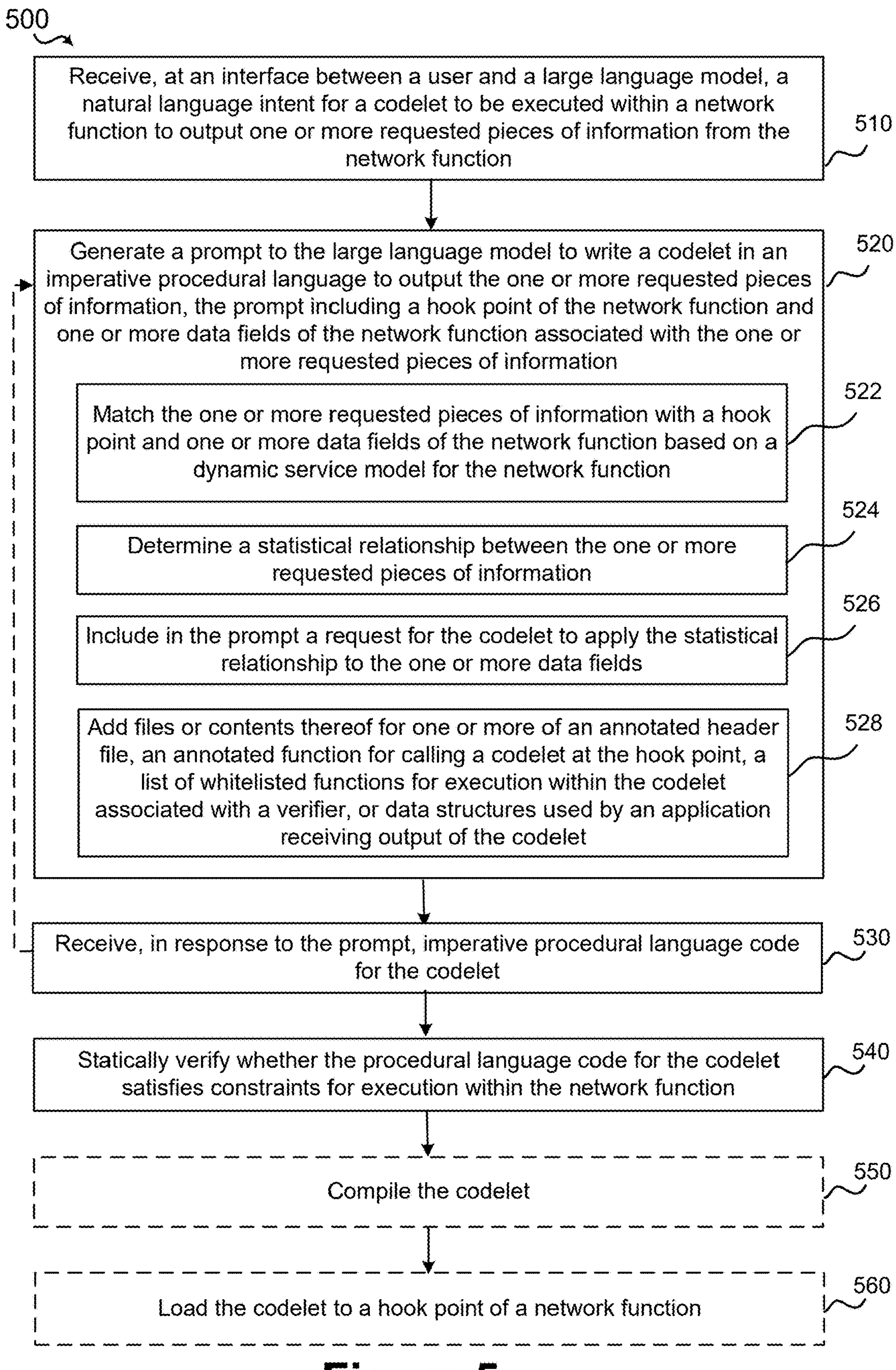
FIG. 5 is a flow diagram of an example of a method for generating a codelet using a LLM.
Figure 6:
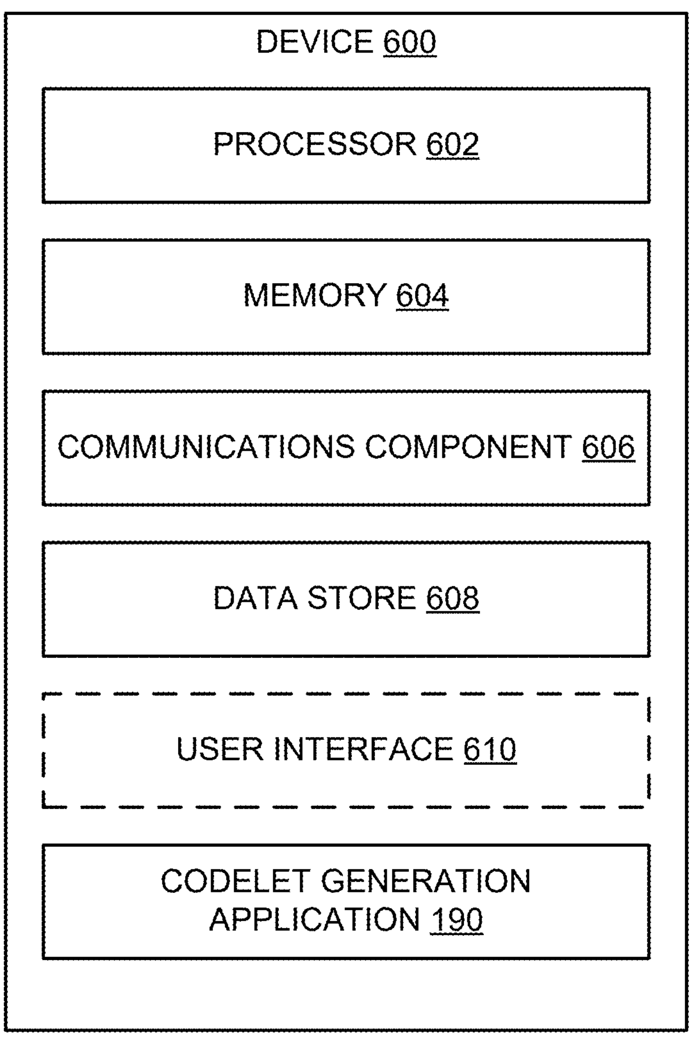
FIG. 6 illustrates an example of a device including additional optional component details as those shown in FIG. 4.

Turning now to FIGS. 1-6, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example vRAN 100 that provides connectivity to a user equipment (UE) 110. For example, the vRAN 100 may implement a 5G communications network. The vRAN 100 may include radio units 120 that transmit and receive wireless signals with the UE 110. The vRAN 100 may include a virtual distributed unit (vDU) 130 that performs processing, for example, at the physical (PHY) layer, media access control (MAC) layer, and radio link control (RLC) layer. The vRAN 100 may include a virtual central unit (vCU) 140 that performs processing at higher layers of the wireless protocol stack. The vRAN 100 may include core network functions 150 that provide user and session management.

The division of functionality between the vDU 130 and the vCU 140 may depend on a functional split architecture. The vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer. Different components or layers may have different latency and throughput requirements. For example, the PHY layer may have latency requirements between 125 μs and 1 ms and a throughput requirement greater than 1 Gbps, the MAC and RLC layers may have latency requirements between 125 μs and 1 ms and a throughput requirement greater than 100 Mbps, and the higher layers at the vCU may have latency requirements greater than 125 μs and a throughput requirement greater than 100 Mbps.

Higher layer network functions may be referred to as core network functions 150. For example, the core network functions may include one or more Access and Mobility Management Functions (AMFs), a Session Management Function (SMF), and a User Plane Function (UPF). These network functions may provide for management of connectivity of the UE 110. For example, the UPF may provide processing of user traffic to and from the Internet. For instance, a UPF may receive user traffic packets and forward the packets to a server via one or more routers using Internet protocol.

In an aspect, the network functions of the vRAN 100 may be programmed by installing a codelet 132 to execute within a network function. A codelet generation application 190 may utilize a large language model to generate codelets 132 for installation within the network functions, for example, to collect data from the network functions.

In some implementations, the vRAN 100 includes a RAN intelligent controller (RIC) that performs autonomous configuration and optimization of the vRAN 100. The RIC is implemented at multiple locations as at least a real-time RIC 162 and a near-real-time RIC 172 or a non-real-time RIC 182. For instance, the real-time RIC 162 is executed at a far-edge datacenter 160 that also executes a vRAN function such as the vDU 130 or the vCU 140. The near-real-time RIC 172 is executed at a near-edge datacenter 170. The non-real-time RIC 182 may be executed at either the near-edge datacenter 170 or a cloud datacenter 180. In an aspect, each datacenter is associated with a set of computing resources. For example, the computing resources at the far-edge datacenter 160 are a first set of computing resources and the computing resources at the near-edge datacenter 170 are a second set of computing resources.

Programmability in vRAN functions (e.g., Open RAN components) may be facilitated through the codelets 132 and the RIC. A network operator can install applications (Apps 158, e.g., xApps in Open RAN) on top of any of the real-time RIC 162. the near-real-time RIC 172, or the non-real-time RIC 182. Each RIC may collect network data from the network functions using the codelets 132 and may leverage the network data to optimize network performance or report issues on a time-frame based on location. For example, a real-time RIC may operate with latency less than 10 milliseconds (ms); the near-real-time RIC 172 may operates with latency greater than 10 ms to seconds; and the non-real-time RIC 182 may operate with latency greater than 10 seconds. The RICs may obtain the network data from various sources. For example, the data collection and control of the vRAN components may be facilitated through service models that are embedded in the vRAN functions by vendors. The service models may explicitly define the type and frequency of data reporting for each App 158, as well as a list of control policies that the RIC can use to modify the RAN behavior. Such services models may collect significant network events occur at a relatively low rate (100 s of ms to seconds), which is suitable for the near-real-time RIC 172 and the non-real-time RIC 182. In some implementations, a dynamic service model may define hook points and operational data that can be accessed by a codelet at each hook point.

In an aspect, the present disclosure provides for a codelet generation application 190 configured to utilize a large language model (LLM) to generate codelets 132. For example, the codelet generation application 190 may be an application at a cloud datacenter 180, where the codelet generation application 190 may be stored in one or more memories 186 and executed by one or more CPU(s) 184. Likewise, the LLM 188 may be stored in in one or more memories 186 and executed by one or more CPU(s) 184 of the cloud datacenter 180 or another cloud data center. In some implementations, the LLM 188 may be provided as a service that is accessible via an application programming interface (API) that allows submission of a prompt and returns a result.

The codelet generation application 190 includes a user interface 192, a prompt component 194, and a codelet verifier 196. In some implementations, the codelet generation application 190 may include a correction component 198. The user interface 192 is configured to receive a natural language intent for a codelet to be executed within a network function to output one or more requested pieces of information from the network function. The prompt component 194 is configured to generate a prompt to the large language model to write a codelet in an imperative procedural language to output the one or more requested pieces of information, the request including a hook point of the network function and one or more data fields of the network function associated with the one or more requested pieces of information. The codelet verifier 196 is configured to receive, in response to the request, imperative procedural language code for the codelet and to statically verify whether the procedural language code for the codelet satisfies constraints for execution within the network function. The correction component 198 may be configured to generate a second prompt including the error and requesting the LLM to correct the error.

Figure 2:
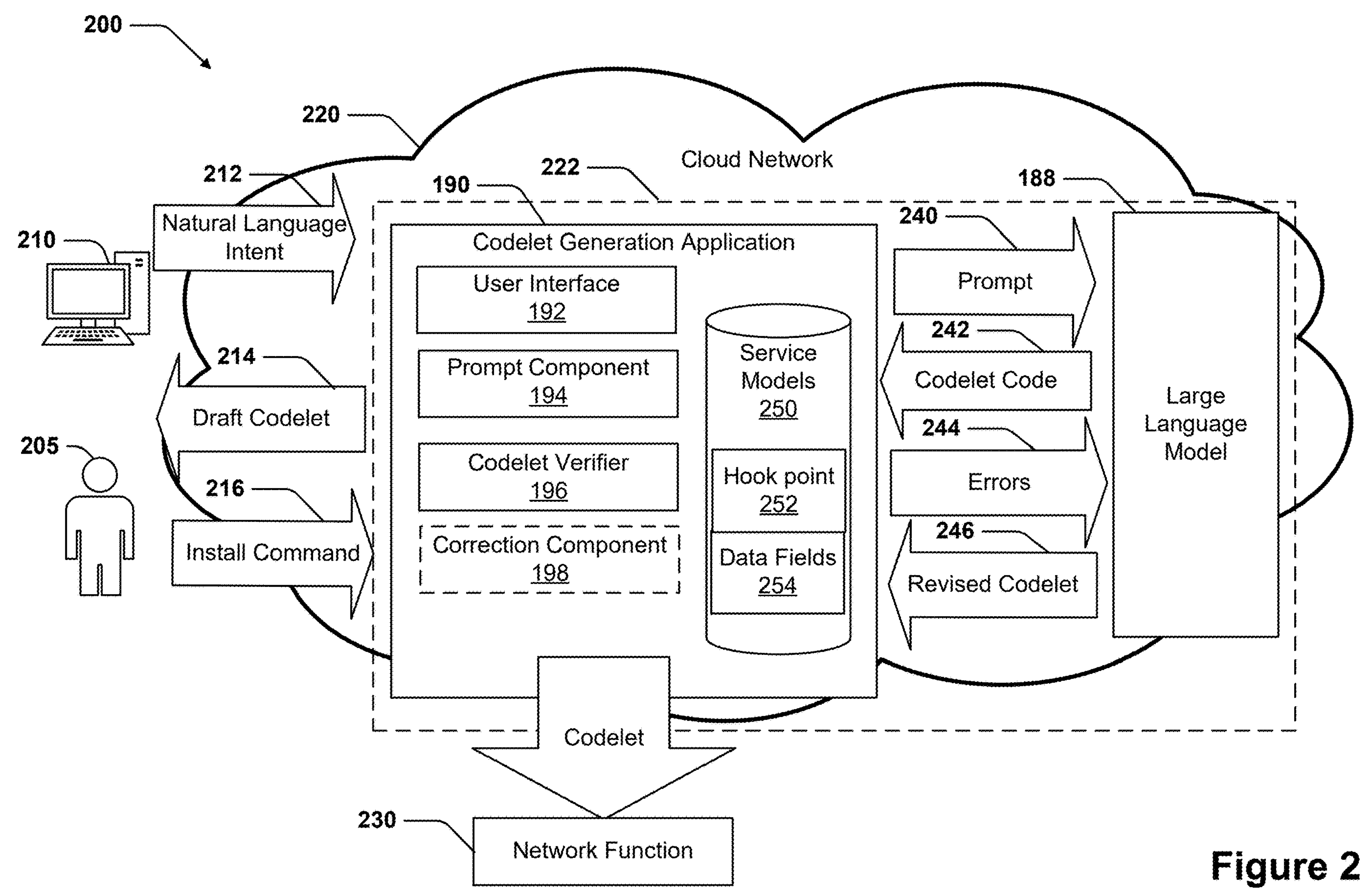
FIG. 2 is a diagram of an example of an architecture for a system to generate codelets for network functions using a large language model (LLM), in accordance with aspects described herein.

FIG. 2 is a conceptual diagram 200 of an example of an architecture for a system 220 to generate codelets using a large language model (LLM) 188. The system 220 may be, for example, a cloud network including computing resources (e.g., at a cloud datacenter 180) that are controlled by a network operator and accessible to clients such as a user device 210 operated by a user 205. In some implementations, the client may be an operator of the vRAN 100. For example, the system 220 may include a plurality of datacenters 222 (e.g., far-edge datacenter 160, near-edge datacenter 170, or cloud datacenter 180) that include computing resources such as computer memory and processors. In some implementations, the datacenters 222 may host a compute service that provides computing nodes on computing resources located in the datacenter. The computing nodes may be containerized execution environments with allocated computing resources. For example, the computing nodes may be virtual machines (VMs), process-isolated containers, or kernel-isolated containers. The nodes may be instantiated at a datacenter 222 and imaged with software (e.g., operating system and applications for a service). The system 220 may include edge routers that connect the datacenters 222 to external networks such as internet service providers (ISPs) or other autonomous systems (ASes) that form the Internet.

The system 220 may provide a large language model (LLM) 188 that is configured to receive a natural language prompt and output a response. The LLM 188 may be a specific instance or version of a LLM artificial intelligence that has been trained and fine-tuned on a large corpus of text. The LLM may be a Generalized Pre-trained Transformer (GPT) model. For example, a GPT model may include millions or billions of parameters trained on vast amounts of data (e.g., gigabytes or terabytes of text). A GPT model is a type of neural network that uses a transformer architecture to learn from large amounts of text data. The model has two main components: an encoder and a decoder. The encoder processes the input text and converts it into a sequence of vectors, called embeddings, that represent the meaning and context of each word. The decoder generates the output text by predicting the next word in the sequence, based on the embeddings and the previous words. The model uses a technique called attention to focus on the most relevant parts of the input and output texts, and to capture long-range dependencies and relationships between words. The model is trained by using a large corpus of texts as both the input and the output, and by minimizing the difference between the predicted and the actual words. The model can then be fine-tuned or adapted to specific tasks or domains, by using smaller and more specialized datasets. For example, the LLM 188 may be tuned for generating codelets based on a codelet library including a repository of verifiable codelets and incorrect codelets.

The LLM 188 may provide an application programming interface (API) that allows other applications to interact with the LLM 188. For example, the API may allow a user or application to provide a prompt to the LLM 188. Prompts are the inputs or queries that a user or a program gives to an LLM AI, in order to elicit a specific response from the model. Prompts can be natural language sentences or questions, or code snippets or commands, or any combination of text or code, depending on the domain and the task. Prompts can also be nested or chained, meaning that the output of one prompt can be used as the input of another prompt, creating more complex and dynamic interactions with the model.

The codelet generation application 190 may be an application that interfaces between the LLM 188 and user 205. For example, the codelet generation application 190 may provide a graphical user interface 192 on the user device 210 for the user 205. The codelet generation application 190 may receive a natural language intent 212 from the user 205. The codelet generation application 190 and/or the prompt component 194 may generate and structure one or more prompts 240 based on the natural language intent 212. For example, the prompt 240 may include a hook point 252 of the network function and one or more data fields 254 of the network function associated with the one or more requested pieces of information. The codelet generation application 190 may provide the prompt 240 to the LLM 188. The LLM 188 may generate codelet code 242 in an imperative procedural language to output the one or more requested pieces of information.

In some implementations, the prompt component 194 may supplement the natural language intent 212 with information about a context of the natural language intent drawn from various sources. For example, existing codelets may include annotated header files that include definitions within comments. The prompt component 194 may use the annotated header file to map terms of the natural language intent to data fields 254. Accordingly, the prompt component 194 may supplement the natural language intent 212 with specific information regarding the network function. Similarly, annotated code for a hook point 252 may include an annotated function for calling the codelet including a description of how a call can be made to the hook point and parameters that are passed to the hook point. A third example source of information for the prompt component 194 is a whitelist of functions known by the codelet verifier 196. The prompt component 194 may supplement the natural language intent 212 to indicate that the whitelist of functions are allowed functions for the codelet. A fourth example source of information is data structures used by an application receiving output of the codelet. For instance, the prompt component 194 may provide one or more defined structures that correspond to the data fields 254.

The codelet generation application 190 and/or the codelet verifier 196 may statically verify whether the procedural language code for the codelet satisfies constraints for execution within the network function. In some implementations, the codelet generation application 190 and/or the codelet verifier 196 may compile the procedural language code to determine whether the code is syntactically correct. In some implementations, when errors are detected by the codelet verifier 196, the correction component 198 may generate a second prompt including the error 244 and request the LLM 188 to correct the error. For example, an error 244 from the codelet verifier 196 may indicate a potential out of bounds error, and the LLM 188 may add a boundary check condition into the codelet. The codelet generation application 190 may receive revised codelet 246, which may be provided to the codelet verifier 196 for verification. In some implementations, the verification process may be interactive with the user 204. For example, the correction component 198 may provide a draft codelet 214 to the user 205. The user 205 may edit the draft codelet 214, the natural language intent 212, the prompt 240, and/or the second prompt including error 244 to facilitate the verification process. In some implementations, once the draft codelet 214 passes the verification, the user 205 may issue an install command to load the codelet 132 to a hook point of a network function 230.

FIG. 3 is a diagram 300 of an example natural language intent 212, an example generated prompt 240, and an example resulting draft codelet 214. The natural language intent 212 may be text provided by a user 205. The generated prompt 240 may be generated by the codelet generation application 190. The draft codelet 214 may be generated by the LLM 188.

The codelet generation application 190 may provide instructions for the user 205 to create the intent 212, but does not generally restrict the text entered by the user. In some implementations, the user interface 192 may provide some contextual information for the user regarding a network deployment. For example, the user interface 192 may provide names of network functions or lists of information available at network functions. In the illustrated example, the natural language prompt may state, "Generate a codelet that reports average number of packets scheduled by the cell every minute."

The codelet generation application 190 and/or prompt component 194 may generate the prompt 240 by supplementing the intent 212. For example, the prompt component 194 may add technical requirements of the codelet such as a programming language and constraints. The prompt component 194 may add details of a network deployment such as models or versions of network functions. In some implementations, the prompt component 194 may access a service model 250 for a network function to determine the hook points and operational parameters of the network function. In some implementations, the prompt component 194 may translate informal names of pieces of information into operational parameters defined in a service model 250. For instance, the prompt component 194 may find a description of an operational parameter that most closely matches the piece of information, then supplement or replace the name of the piece of information with the corresponding operational parameter and hook point where the operational parameter can be accessed. In some implementations, the prompt component 194 may be configured with a library of statistical functions, which may be defined in code or pseudocode. The prompt component 194 may supplement or replace terms that indicate a statistical operation with a definition of the statistical function.

In the illustrated example, the changes to the natural language intent are underlined. The prompt 240 includes the imperative programing language name (C code), a name of a network function (vDU model Y9572), an identifier of a hookpoint (x1934), a statistical operation (mean value . . . over 1 minute interval), and a field name (nDCI). The programming language may be configured based on requirements for codelets. The name of the network function may be derived from a subject or object of the intent (cell) and a lookup in the network deployment. The statistical operation may be translated by selecting from a set of statistical operations. The hookpoint and field may be selected from the service model 250 corresponding to the network function. Additionally, the prompt 240 may include links to additional sources of information that may be used by the LLM. For instance, the bracketed terms may be replaced with file names associated with the network function, hookpoint, verifier, or target application.

The draft codelet 214 includes code in an imperative procedural language such as C. The draft codelet 214 may be reviewed and revised by the user 205. In the illustrated example, the draft codelet 214 includes C code for processing a message to determine whether to count a packet. The draft codelet 214 may use the internal variable names defined for the context in which the codelet is to be executed.

FIG. 4 is a schematic diagram of an example of an apparatus 400 (e.g., a computing device) for generating codelets for execution within a network function of a communication network (e.g., a 5G network). The apparatus 400 may be implemented as one or more computing devices in the system 220.

In an example, the apparatus 400 includes at least one processor 402 and a memory 404 configured to execute or store instructions or other parameters related to providing an operating system 406, which can execute one or more applications or processes, such as, but not limited to, the codelet generation application 190. For example, processors 402 and memory 404 may be separate components communicatively coupled by a bus (e.g., on a motherboard or other portion of a computing device, on an integrated circuit, such as a system on a chip (SoC), etc.), components integrated within one another (e.g., a processor 402 can include the memory 404 as an on-board component), and/or the like. Memory 404 may store instructions, parameters, data structures, etc. for use/execution by processor 402 to perform functions described herein. In some implementations, the memory 404 includes the database 452 for use by the codelet generation application 190. In some implementations, the apparatus 400 includes the LLM 188, for example, as another application executing on the processors 402. Alternatively, the LLM 188 may be executed on a different device that may be accessed via an API 450.

In an example, the 190 includes the user interface 192, prompt component 194, codelet verifier 196, and correction component 198 discussed above with respect to FIG. 1.

In some implementations, the apparatus 400 is implemented as a distributed processing system, for example, with multiple processors 402 and memories 404 distributed across physical systems such as servers, virtual machines, or datacenters 222. For example, one or more of the components of the codelet generation application 190 may be implemented as services executing at different datacenters 222. The services may communicate via an API.

FIG. 5 is a flow diagram of an example of a method 500 for generating codelets for execution within a network function of a communication network (e.g., a 5G network). For example, the method 500 can be performed by the codelet generation application 190, the apparatus 400 and/or one or more components thereof to generate codelets 132 using the LLM 188.

At block 510, the method 500 includes receiving, at an interface between a user and a large language model, a natural language intent for a codelet to be executed within a network function to output one or more requested pieces of information from the network function. For example, in an aspect, apparatus 400, processor 402, memory 404, and/or codelet generation application 190 and/or user interface 192 may be configured to or may comprise means for receiving, at an interface 192 between a user 205 and a large language model 188, a natural language intent 212 for a codelet 132 to be executed within a network function 230 to output one or more requested pieces of information from the network function.

At block 520, the method 500 includes generating a prompt to the large language model to write a codelet in an imperative procedural language to output the one or more requested pieces of information, the prompt including a hook point of the network function and one or more data fields of the network function associated with the one or more requested pieces of information. For example, in an aspect, apparatus 400, processor 402, memory 404, codelet generation application 190, and/or prompt component 194 may be configured to or may comprise means for generating a prompt 240 to the large language model 188 to write a codelet in an imperative procedural language to output the one or more requested pieces of information, the prompt including a hook point 252 of the network function and one or more data fields 254 of the network function associated with the one or more requested pieces of information. In some implementations, at sub-block 512, the block 510 may include matching the one or more requested pieces of information with a hook point 252 and one or more data fields 254 of the network function based on a dynamic service model 250 for the network function 230. For instance, the one or more data fields may include one or more of operational data of the network function, filtered data, or aggregated data. In some implementations, at sub-block 514, the block 510 may include determining a statistical relationship between the one or more requested pieces of information. At sub-block 516, the block 510 may include including in the prompt a request for the codelet to apply the statistical relationship to the one or more data fields. In some implementations, at sub-block 518, the block 510 may optionally include adding files or contents thereof for one or more of an annotated header file, an annotated function for calling a codelet at the hook point, a list of whitelisted functions for execution within the codelet associated with a verifier, or data structures used by an application receiving output of the codelet.

At block 530, the method 500 includes receiving, in response to the prompt, imperative procedural language code for the codelet. For example, in an aspect, apparatus 400, processor 402, memory 404, codelet generation application 190, and/or codelet verifier 196 may be configured to or may comprise means for receiving, in response to the prompt, imperative procedural language code for the codelet. In some implementations, the codelet is configured to write the one or more pieces of information into a protobuf schema defined based on a structure for an application to receive output.

At block 540, the method 500 includes statically verifying whether the procedural language code for the codelet satisfies constraints for execution within the network function. For example, in an aspect, apparatus 400, processor 402, memory 404, codelet generation application 190, and/or codelet verifier 196 may be configured to or may comprise means for statically verifying whether the procedural language code for the codelet satisfies constraints for execution within the network function. In some implementations, a result of statically verifying the procedural language code for the codelet is an error. The method 500 may further include generating a second prompt including the error and requesting the large language model to correct the error. For example, the method 500 may return to block 520 to add the request to correct the error.

In some implementations, the method 500 optionally further includes, at block 550, compiling the codelet. In some implementations, the method 500 optionally further includes, at block 560, loading the codelet to a hook point of a network function.

FIG. 6 illustrates an example of a device 600 including additional optional component details as those shown in FIG. 4. In one aspect, device 600 includes processor 602, which may be similar to processor 402 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 further includes memory 604, which may be similar to memory 404 such as for storing local versions of operating systems (or components thereof) and/or applications being executed by processor 602, such as the codelet generation application 190, the user interface 192, the prompt component 194, the codelet verifier 196, etc. Memory 604 can include a type of memory usable by a computer, such as random access memory (RAM), read only memory (ROM), tapes, magnetic discs, optical discs, volatile memory, non-volatile memory, and any combination thereof. The processor 602 may execute instructions stored on the memory 604 to cause the device 600 to perform the methods discussed above with respect to FIG. 5.

Further, device 600 includes a communications component 606 that provides for establishing and maintaining communications with one or more other devices, parties, entities, etc. utilizing hardware, software, and services as described herein. Communications component 606 carries communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc. not currently being executed by processor 602. In addition, data store 608 may be a data repository for the codelet generation application 190.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 additionally includes the codelet generation application 190 for automating a workflow using the LLM 188.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. An apparatus comprising: one or more memories storing computer executable instructions; and one or more processors coupled with the one or more memories and, individually or in combination, configured to: receive, at an interface between a user and a large language model, a natural language intent for a codelet to be executed within a network function to output one or more requested pieces of information from the network function; generate a prompt to the large language model to write a codelet in an imperative procedural language to output the one or more requested pieces of information, the request including a hook point of the network function and one or more data fields of the network function associated with the one or more requested pieces of information; receive, in response to the request, imperative procedural language code for the codelet; and statically verify whether the procedural language code for the codelet satisfies constraints for execution within the network function.

Clause 2. The apparatus of clause 1, wherein to generate the prompt, the one or more processors, individually or in combination, are configured to match the one or more requested pieces of information with a hook point and one or more data fields of the network function based on a dynamic service model for the network function.

Clause 3. The apparatus of clause 2, wherein the one or more data fields include one or more of operational data of the network function, filtered data, or aggregated data.

Clause 4. The apparatus of clause 2 or 3, wherein to generate the prompt, the one or more processors, individually or in combination, are configured to: determine a statistical relationship between the one or more requested pieces of information; and include in the prompt a request for the codelet to apply the statistical relationship to the one or more data fields.

Clause 5. The apparatus of any of clauses 1-4, wherein to generate the prompt, the one or more processors, individually or in combination, are configured to add files or contents thereof for one or more of an annotated header file, an annotated function for calling a codelet at the hook point, a list of whitelisted functions for execution within the codelet associated with a verifier, or data structures used by an application receiving output of the codelet.

Clause 6. The apparatus of any of clauses 1-5, wherein the codelet is configured to write the one or more pieces of information into a protobuf schema defined based on a structure for an application to receive output.

Clause 7. The apparatus of any of clauses 1-6, wherein a result of statically verifying the procedural language code for the codelet is an error, wherein the one or more processors, individually or in combination, are configured to generate a second prompt including the error and request the large language model to correct the error.

Clause 8. The apparatus of any of clauses 1-7, wherein the large language model is tuned on a codelet library including a repository of verifiable codelets and incorrect codelets.

Clause 9. The apparatus of any of clauses 1-8, wherein the one or more processors, individually or in combination, are configured to: compile the codelet; and load the codelet to a hook point of a network function.

Clause 10. A method of generating codelets for execution within a network function of a 5G network, comprising: receiving, at an interface between a user and a large language model, a natural language intent for a codelet to be executed within a network function to output one or more requested pieces of information from the network function; generating a prompt to the large language model to write a codelet in an imperative procedural language to output the one or more requested pieces of information, the prompt including a hook point of the network function and one or more data fields of the network function associated with the one or more requested pieces of information; receiving, in response to the prompt, imperative procedural language code for the codelet; and statically verifying whether the procedural language code for the codelet satisfies constraints for execution within the network function.

Clause 11. The method of clause 10, wherein generating the prompt comprises matching the one or more requested pieces of information with a hook point and one or more data fields of the network function based on a dynamic service model for the network function.

Clause 12. The method of clause 11, wherein the one or more data fields include one or more of operational data of the network function, filtered data, or aggregated data.

Clause 13. The method of clause 11 or 12, wherein to generating the prompt comprises: determining a statistical relationship between the one or more requested pieces of information; and including in the prompt a request for the codelet to apply the statistical relationship to the one or more data fields.

Clause 14. The method of any of clauses 10-13, generating the prompt comprises adding files or contents thereof for one or more of an annotated header file, an annotated function for calling a codelet at the hook point, a list of whitelisted functions for execution within the codelet associated with a verifier, or data structures used by an application receiving output of the codelet.

Clause 15. The method of any of clauses 10-14, wherein the codelet is configured to write the one or more pieces of information into a protobuf schema defined based on a structure for an application to receive output.

Clause 16. The method of any of clauses 10-15, wherein a result of statically verifying the procedural language code for the codelet is an error, the method further comprising generating a second prompt including the error and request the large language model to correct the error.

Clause 17. The method of any of clauses 10-16, wherein the large language model is tuned on a codelet library including a repository of verifiable codelets and incorrect codelets.

Clause 18. The method of any of clauses 10-117, further comprising: compiling the codelet; and loading the codelet to a hook point of a network function.

Clause 19. A non-transitory computer-readable medium having computer-executable instructions stored thereon that when executed by a computer processor cause the computer processor to: receive, at an interface between a user and a large language model, a natural language intent for a codelet to be executed within a network function to output one or more requested pieces of information from the network function; generate a prompt to the large language model to write a codelet in an imperative procedural language to output the one or more requested pieces of information, the prompt including a hook point of the network function and one or more data fields of the network function associated with the one or more requested pieces of information; receive, in response to the prompt, imperative procedural language code for the codelet; and statically verify whether the procedural language code for the codelet satisfies constraints for execution within the network function.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims.

Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus comprising:
- one or more memories storing computer executable instructions; and
- one or more processors coupled with the one or more memories and, individually or in combination, configured to:
  - receive, at an interface between a user and a large language model, a natural language intent for a codelet to be executed within a network function to output one or more requested pieces of information from the network function;
  - generate a prompt to the large language model to write a codelet in an imperative procedural language to output the one or more requested pieces of information, the request including a hook point of the network function and one or more data fields of the network function associated with the one or more requested pieces of information;
  - receive, in response to the request, imperative procedural language code for the codelet;
  - statically verify whether the procedural language code for the codelet satisfies constraints for execution within the network function;
  - compile the codelet; and
  - load the codelet to the hook point of the network function.

2. The apparatus of claim 1, wherein to generate the prompt, the one or more processors, individually or in combination, are configured to match the one or more requested pieces of information with the hook point and the one or more data fields of the network function based on a dynamic service model for the network function.

3. The apparatus of claim 2, wherein the one or more data fields include one or more of operational data of the network function, filtered data, or aggregated data.

4. The apparatus of claim 2, wherein to generate the prompt, the one or more processors, individually or in combination, are configured to:
- determine a statistical relationship between the one or more requested pieces of information; and
- include in the prompt a request for the codelet to apply the statistical relationship to the one or more data fields.

5. The apparatus of claim 1, wherein to generate the prompt, the one or more processors, individually or in combination, are configured to add files or contents thereof for one or more of an annotated header file, an annotated function for calling a codelet at the hook point, a list of whitelisted functions for execution within the codelet associated with a verifier, or data structures used by an application receiving output of the codelet.

6. The apparatus of claim 1, wherein the codelet is configured to write the one or more pieces of information into a protobuf schema defined based on a structure for an application to receive output.

7. The apparatus of claim 1, wherein a result of statically verifying the procedural language code for the codelet is an error, wherein the one or more processors, individually or in combination, are configured to generate a second prompt including the error and request the large language model to correct the error.

8. The apparatus of claim 1, wherein the large language model is tuned on a codelet library including a repository of verifiable codelets and incorrect codelets.

9. A method of generating codelets for execution within a network function of a 5G network, comprising:
- receiving, at an interface between a user and a large language model, a natural language intent for a codelet to be executed within a network function to output one or more requested pieces of information from the network function;
- generating a prompt to the large language model to write a codelet in an imperative procedural language to output the one or more requested pieces of information, the prompt including a hook point of the network function and one or more data fields of the network function associated with the one or more requested pieces of information;
- receiving, in response to the prompt, imperative procedural language code for the codelet;
- statically verifying whether the procedural language code for the codelet satisfies constraints for execution within the network function;
- compiling the codelet; and
- loading the codelet to the hook point of the network function.

10. The method of claim 9, wherein generating the prompt comprises matching the one or more requested pieces of information with the hook point and the one or more data fields of the network function based on a dynamic service model for the network function.

11. The method of claim 10, wherein the one or more data fields include one or more of operational data of the network function, filtered data, or aggregated data.

12. The method of claim 10, wherein to generating the prompt comprises:
- determining a statistical relationship between the one or more requested pieces of information; and
- including in the prompt a request for the codelet to apply the statistical relationship to the one or more data fields.

13. The method of claim 9, generating the prompt comprises adding files or contents thereof for one or more of an annotated header file, an annotated function for calling a codelet at the hook point, a list of whitelisted functions for execution within the codelet associated with a verifier, or data structures used by an application receiving output of the codelet.

14. The method of claim 9, wherein the codelet is configured to write the one or more pieces of information into a protobuf schema defined based on a structure for an application to receive output.

15. The method of claim 9, wherein a result of statically verifying the procedural language code for the codelet is an error, the method further comprising generating a second prompt including the error and request the large language model to correct the error.

16. The method of claim 9, wherein the large language model is tuned on a codelet library including a repository of verifiable codelets and incorrect codelets.

17. A non-transitory computer-readable medium having computer-executable instructions stored thereon that when executed by a computer processor cause the computer processor to:
- receive, at an interface between a user and a large language model, a natural language intent for a codelet to be executed within a network function to output one or more requested pieces of information from the network function;

generate a prompt to the large language model to write a codelet in an imperative procedural language to output the one or more requested pieces of information, the prompt including a hook point of the network function and one or more data fields of the network function associated with the one or more requested pieces of information;

receive, in response to the prompt, imperative procedural language code for the codelet;

statically verify whether the procedural language code for the codelet satisfies constraints for execution within the network function;

compile the codelet; and load the codelet to the hook point of the network function.

* * * * *